United States Patent
Malhi

Patent Number: 5,731,686
Date of Patent: Mar. 24, 1998

[54] EMBEDDED BATTERY OVERTEMPERATURE PROTECTION AND VOLTAGE REGULATOR CIRCUITRY

[75] Inventor: Satwinder Malhi, Garland, Tex.

[73] Assignee: Texas Instruments Incorporated, Dallas, Tex.

[21] Appl. No.: 783,687

[22] Filed: Jan. 15, 1997

Related U.S. Application Data

[63] Continuation of Ser. No. 99,752, Jul. 30, 1993, abandoned.

[51] Int. Cl.$^6$ .......................... H01M 10/46; H01M 10/50
[52] U.S. Cl. ............................ 320/35; 320/39; 320/49
[58] Field of Search ................................. 320/2, 35, 36, 320/39, 40, 49

[56] References Cited

U.S. PATENT DOCUMENTS

| | | | |
|---|---|---|---|
| 4,105,962 | 8/1978 | Scott, Jr. et al. | 320/35 X |
| 4,209,736 | 6/1980 | Reidenbach | 320/35 X |
| 4,686,444 | 8/1987 | Park | 320/35 X |
| 4,727,006 | 2/1988 | Malinowski et al. | 320/35 X |
| 4,998,056 | 3/1991 | Cole | 320/35 |
| 5,045,768 | 9/1991 | Pelly | 320/39 X |
| 5,204,608 | 4/1993 | Koenck | 320/2 |
| 5,245,269 | 9/1993 | Tooley et al. | 320/35 |
| 5,247,238 | 9/1993 | Yang | 320/35 |
| 5,355,073 | 10/1994 | Nguyen | 320/39 X |

FOREIGN PATENT DOCUMENTS

| | | | |
|---|---|---|---|
| 0 284 115 | 2/1988 | European Pat. Off. | H01M 10/48 |
| 61-294754 | 12/1986 | Japan. | |
| 63-27836 | 3/1989 | Japan. | |

OTHER PUBLICATIONS

Munshi et al., "Flat Polymer Electrolytes Promise Thin-Film Power", IEEE Spectrum, Aug. 1989, pp. 32–35.

*Primary Examiner*—Peter S. Wong
*Assistant Examiner*—Patrick B. Law
*Attorney, Agent, or Firm*—W. James Brady, III; Richard L. Donaldson

[57] ABSTRACT

A method and apparatus is provided for miniaturizing battery overtemperature protection and voltage regulation circuits in which such protection and regulation circuits are formed in an integrated circuit (200, 600) and embedded in the casings of individual batteries. In one aspect of the invention, a MOSFET switch (Q1), a temperature sensitive diode (D1) and a control circuit (604) may be formed in an integrated circuit (600) and embedded in the casing of a battery. The MOSFET switch may be placed in the charging path of the battery to provide an open circuit when the battery temperature exceeds a predetermined value. In another aspect of the invention, the operation of the MOSFET switch (Q1) may be controlled by a control circuit (204) to provide a constant output voltage from the battery, thereby improving the operation of the portable system using the battery.

5 Claims, 2 Drawing Sheets

— 5,731,686 —

EMBEDDED BATTERY OVERTEMPERATURE PROTECTION AND VOLTAGE REGULATOR CIRCUITRY

This application is a Continuation of application Ser. No. 08/099,752, filed Jul 30, 1993 now abandoned.

TECHNICAL FIELD OF THE INVENTION

This invention relates generally to power sources for personal communications systems, and more particularly, to batteries with embedded overtemperature protection and/or voltage regulator circuitry.

BACKGROUND OF THE INVENTION

The rapid development of smaller, lighter and more efficient personal communication systems, such as personal computer notebooks, sub-notebooks, pocket cellular phones, miniature radios, stereos, and cassette players, has been fueled partly by the development of improved rechargeable batteries. For example, today's nickel cadmium batteries are more powerful than those in use just a few years ago. However, cadmium-based batteries are under increased scrutiny for both environmental and performance reasons. Consequently, the continuing demand for improved rechargeable-battery performance, combined with the need for a more environmentally acceptable battery, has driven the development of new rechargeable-battery technologies, such as, for example, nickel metal hydride batteries. Thus, the emerging generation of rechargeable batteries is not only intended to diminish the use of toxic heavy metals, but also to provide a significant improvement in energy density over existing cells. This improvement in energy density will allow designers of hand-held communications systems to significantly reduce the size of battery supplies and accordingly reduce the size of the hand-held systems. However, these reductions in battery size have not been accompanied by corresponding reductions in battery associated protection circuitry, which has hampered attempts to design smaller systems.

Essentially, the operating life of a rechargeable battery will be reduced if it's temperature rises significantly during the recharging process. In fact, a rechargeable battery can explode at the higher temperatures. Typically, portable communications systems contain protection circuits that monitor battery temperature during the charging process, and open the charging path if a specific temperature threshold is exceeded. A P-N junction diode, which has temperature dependent, forward conduction characteristics, is located in the general vicinity of the battery or power pack (e.g., multiple batteries). The protection circuitry is designed to monitor current flow through the temperature dependent diode and open the charge path at a predetermined temperature. Consequently, both the battery supply and the portable system may be protected from potentially serious damage. Nevertheless, these protection circuits take up precious space and add unnecessary weight to existing portable systems.

Furthermore, in the newer rechargeable batteries, such as the nickel metal hydride batteries, the charging reaction is exothermic rather than endothermic as in the nickel cadmium batteries. Consequently, the nickel metal hydride battery will warm as it charges, whereas the nickel cadmium cell temperature remains relatively constant until the cell moves into overcharge. Therefore, a temperature sensor in the protection circuit must be more sensitive to temperature surges in the nickel metal hydride batteries than for nickel cadmium batteries. However, sensitivity to these relatively small temperature surges may be limited unless the sensor is placed in direct, thermal contact with the battery. Yet, such physical contact is difficult to attain for multiple batteries. Also, space requirements may limit design flexibility with respect to optimum placement of the sensors.

Some portable systems use throw-away power sources, such as alkaline batteries, instead of rechargeable batteries. Thus, overcharging is not a problem with such systems and thermal protection circuitry may not be needed. Nevertheless, the operation of portable systems using either throw-away or rechargeable batteries is affected significantly by variations in battery output voltage. Consequently, most portable systems employ voltage regulating circuits to maintain the battery supply voltage at a constant level. However, similar to the size and weight problems experienced with protection circuits, the relatively large size and weight of voltage regulating circuits have become a major design concern because of the trend toward miniaturization of the portable systems.

SUMMARY OF THE INVENTION

Accordingly, a need exists in the portable communications systems manufacturing industry for smaller, space-optimized battery overtemperature protection and voltage regulation circuits. In accordance with the present invention, a method and apparatus is provided for miniaturizing battery overtemperature protection and voltage regulation circuits in which such protection and regulation circuits are formed in an integrated circuit and embedded in the casings of individual batteries. In one aspect of the invention, a MOSFET switch, a temperature sensitive diode and a control circuit may be formed in an integrated circuit and embedded in the casing of a battery pack. The MOSFET switch may be placed in the charging path of the battery to provide an open circuit when the battery temperature exceeds a predetermined value. In another aspect of the invention, the operation of the MOSFET switch may be controlled to provide a constant output voltage from the battery, thereby improving the operation of the portable system.

An important technical advantage of the present invention is that more sensitive and responsive overtemperature protection may be provided for the overall system by embedding the protection circuitry inside individual batteries.

Another important technical advantage of the present invention is that miniaturization of the overall system may be accomplished more readily since the space formerly used outside the batteries is no longer needed for overtemperature protection and/or voltage regulator circuitry.

An additional technical advantage of the present invention is that a single integrated circuit may be fabricated to provide an embedded overtemperature protection and voltage regulator circuit, which reduces manufacturing costs and the overall price of the system.

BRIEF DESCRIPTION OF THE DRAWINGS

For a more complete understanding of the present invention, and the advantages thereof, reference is now made to the following descriptions taken in conjunction with the accompanying drawings, in which:

FIG. 2 illustrates an electrical schematic circuit diagram of a preferred embodiment of a voltage regulator circuit that

3 may be embedded in a battery according to the teachings of the present invention.

Figure 2:
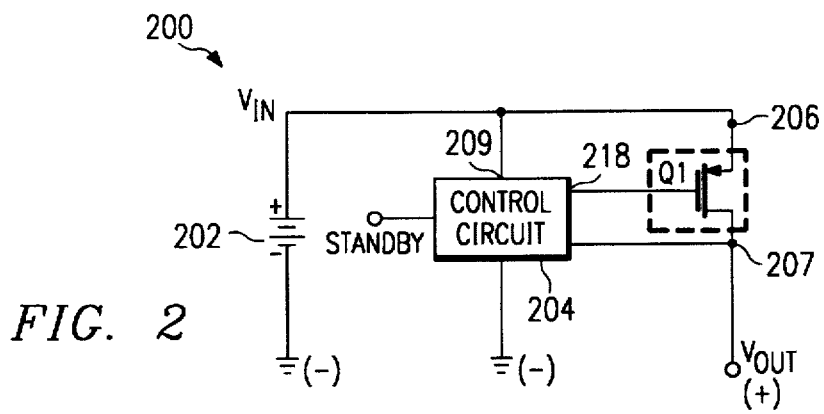
Figure 3:
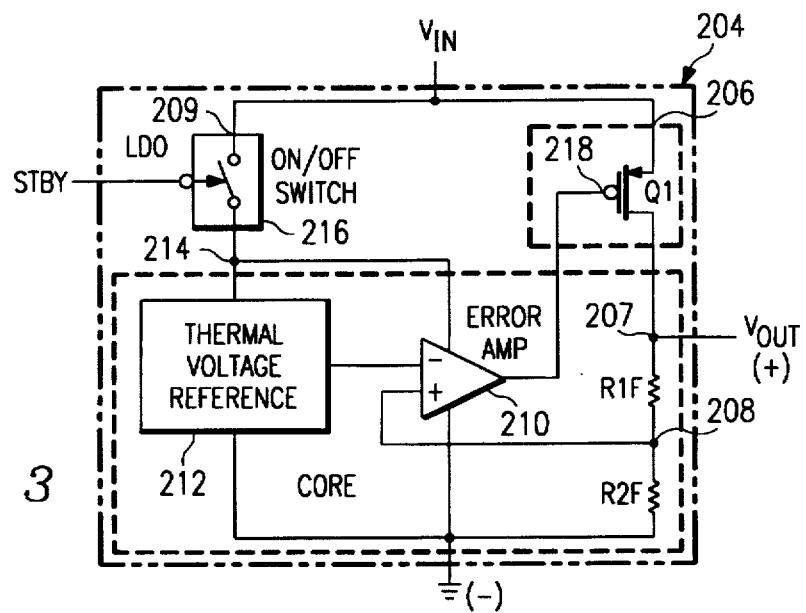

FIG. 3 illustrates an electrical circuit schematic diagram of the control circuit shown in FIG. 2.

Figure 4:
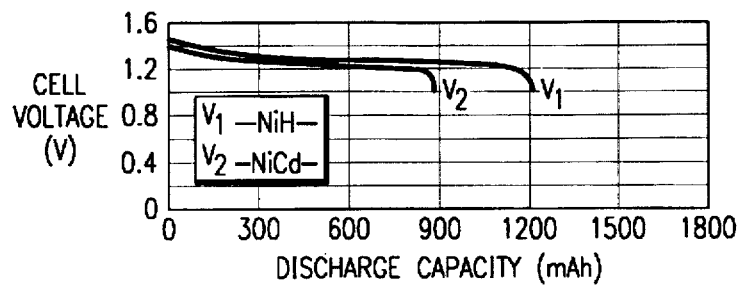

FIG. 4 is a chart that illustrates the decay of unregulated battery cell output voltages over time.

Figure 5:
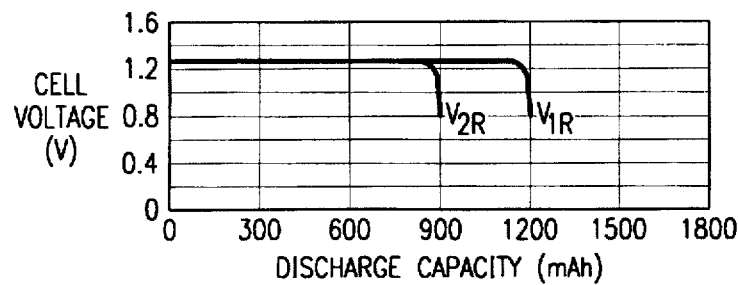

FIG. 5 is a chart that illustrates the regulation of battery cell output voltages over time according to the teachings of the present invention.

Figure 6:
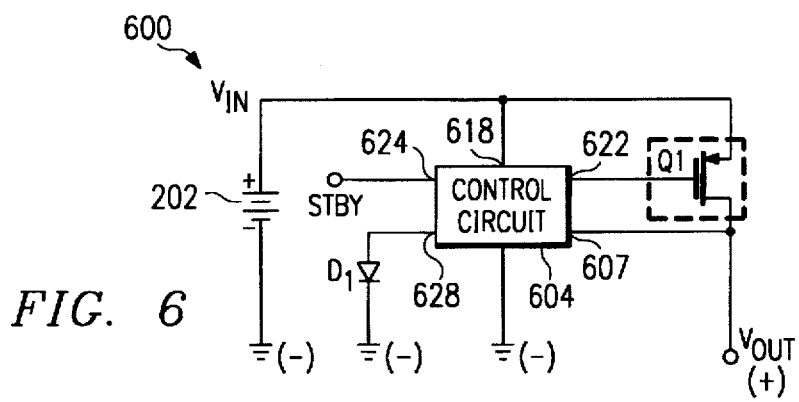

FIG. 6 illustrates an electrical schematic circuit diagram of a preferred embodiment of an overtemperature protection circuit that may be embedded in a battery according to the teachings of the present invention.

Figure 7:
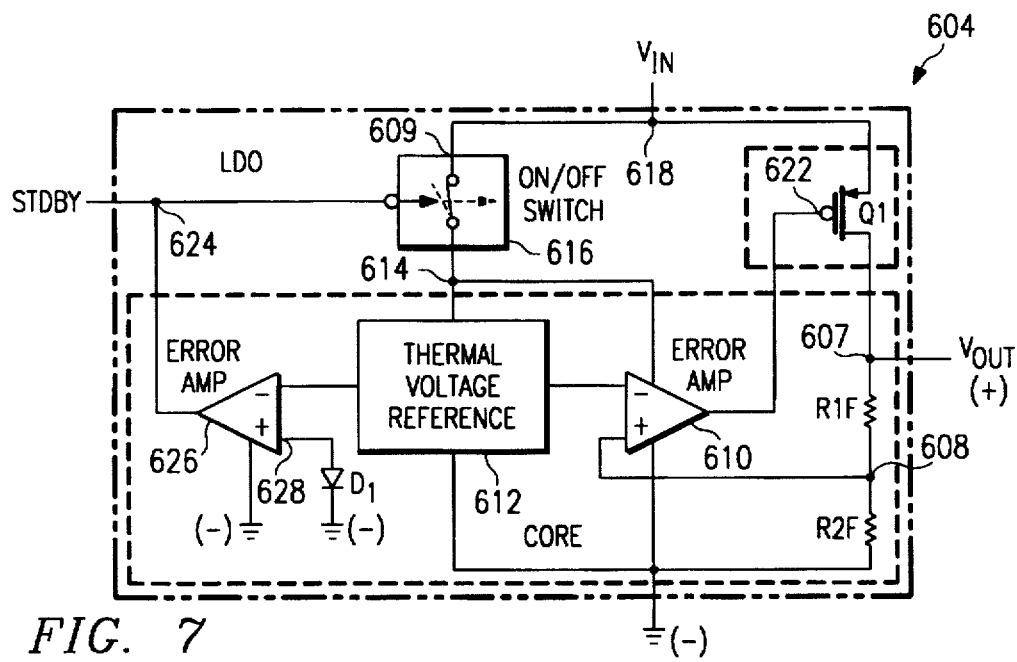

FIG. 7 illustrates an electrical schematic circuit diagram of the control circuit shown in FIG. 6.

DETAILED DESCRIPTION OF THE INVENTION

The preferred embodiment of the present invention and its advantages are best understood by referring to FIGS. 1–7 of the drawings, like numerals being used for like and corresponding parts of the various drawings.

Figure 1A:
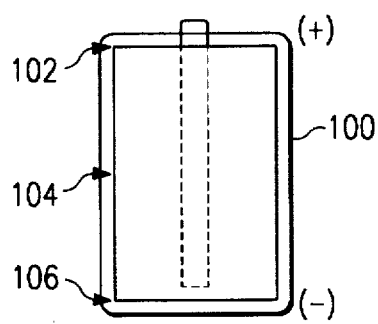
FIGS. 1(a)–(c) illustrate a cross-sectional view of exemplary batteries for use in a portable communications system and alternative locations for placement of an embedded circuit according to the teachings of the present invention.
Figure 1B:
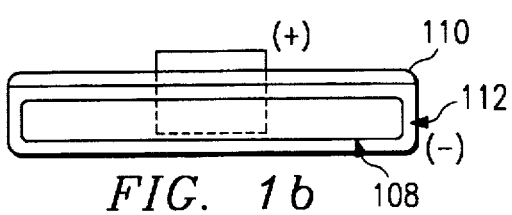
Figure 1C:
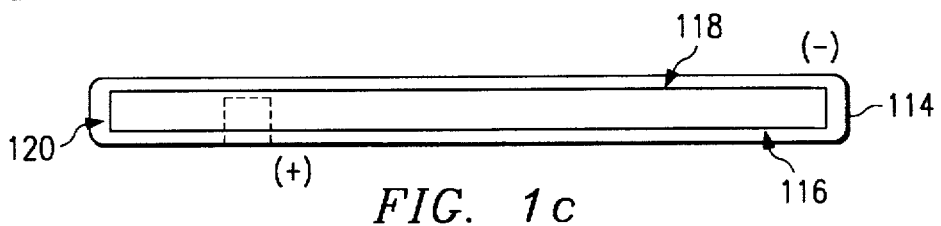

FIGS. 1(a)–(c) illustrate a cross-sectional view of exemplary batteries for use in a portable communications system and alternative locations for placement of an embedded circuit according to the teachings of the present invention. As described below with respect to FIGS. 2–3 and 6–7, the present invention may include either one or both of an overtemperature protection circuit or a voltage regulator circuit formed on an integrated circuit chip. Consequently, the invention may be fabricated to be small enough to be embedded inside the case of either a rechargeable or throwaway battery. Consequently, for battery 100 in FIG. 1(a), which may represent, for example, any of rechargeable or throwaway batteries of AAA, AA, A, B, C or D sizes, the invention may be placed at locations 102 or 106, or in any appropriate space between the cell material and the battery's casing to include a curved area at the side of the battery, such as location 104. However, since the integrated circuit of the present invention may be formed as a flat die, it may be preferable to locate the invention directly on a flat surface of the battery, such as, for example, a flat surface of the casing at respective top and bottom locations 102 and 106, for maximum physical contact and maximum sensitivity to temperature variations, although such specific placement is not required to practice the invention. Essentially, a finite area will exist between the cell material and the battery's casing which is larger than the integrated circuit comprising the present invention. Consequently, the invention requires no additional space in the portable system and provides only an insignificant amount of additional weight.

For battery 110 in FIG. 1(b), which may represent a typical flat, circular battery, the invention may be placed at respective bottom or side locations 108 or 112, which is within a space between the battery cell material and the casing. Similarly, for battery 114 in FIG. 1(c), which may represent a flat, elongated battery, such as one configuration used for a nickel metal hydride battery, the invention may be placed at respective top, bottom and side locations 118, 116 and 120, or again in spaces between the cell material and casing of the battery. Although it may be preferable to place the integrated circuit of the present invention between the cell material and the casing of a battery, it would be within the scope of the invention to place the present integrated circuit within the cell material itself, or at any other appropriate location within the battery.

FIG. 2 illustrates an electrical schematic circuit diagram of a preferred embodiment of a voltage regulator circuit that may be embedded in a battery according to the teachings of the present invention. Voltage regulator circuit 200 shown in FIG. 2 may be fabricated as a single integrated circuit chip, or combined alternatively on a single integrated circuit chip with the overtemperature protection circuit described below with respect to FIGS. 6 and 7. Battery cell 202 may represent a cell in any of respective batteries 100, 110 or 114 shown in FIGS. 1(a)–(c), or any other appropriate rechargeable or throw-away battery used for portable communication systems. Transistor Q1, which may be a p-channel MOSFET switch, is connected in series with the positive pole of cell 202 and the positive, external connection (+) of the battery. Specifically, the negative pole of cell 202 is connected to the negative, external connection (−) of the battery. Typically, the cell's negative pole is connected to the battery's metallic casing. The positive pole of cell 202 is connected to the source of p-channel MOSFET Q1 and node 206, which is connected to voltage input connection Vin and node 209 of control circuit 204. The drain of transistor Q1 is connected to the positive, external connection (+) of the battery and node 207, which is connected to voltage output connection rout of control circuit 204. The specific wiring relationship between transistor Q1, cell 202, and the external connections of the battery is not explicitly shown in FIGS. 1(a)–(c), but the arrangement of such wiring may be readily understood by one of ordinary skill in the relevant art. The gate of transistor Q1 is connected to output connection 218 of control circuit 204.

FIG. 3 illustrates an electrical circuit schematic diagram of the control circuit shown in FIG. 2. Control circuit 204 may be a low drop out regulator (LDO), such as, for example, Texas Instruments part number TL75LP05, which is produced by Texas Instruments Incorporated, or any appropriate integrated circuit designed to perform at least the function of regulating voltage, or used additionally in conjunction with a MOSFET switch. Control circuit 204 may be combined on a single integrated circuit chip with MOSFET switch Q1, or the two devices may be provided as separate integrated circuits. Referring to FIGS. 2 and 3, voltage input Vin is connected to a first pole of on/off switch 216. The switching pole of switch 216 is connected to node 214, and a third pole of the switch is connected to a switch standby control. In the position shown in FIG. 3, switch 216 is in the "off" or standby position. In the "on" position of switch 216, the switching pole is moved to a second position, whereby node 214 is connected through the switch to voltage input connection Vin. Node 214 is also connected to an output connection of thermal voltage reference 212, which is used to provide temperature stability for the control circuit. Node 214 is also connected to a bias input of error amplifier 210. A second output connection of thermal voltage reference 212 is connected to the negative signal input connection of error amplifier 210. An output of error amplifier 210 is connected to the gate of MOSFET switch Q1. Reference 212 and amplifier 210 are connected to circuit ground, which is wired to the negative external connection (−) of cell 202. Node 207 is connected to a terminal of resistor R1F. The opposite terminal of resistor R1F is connected to one terminal of resistor R2F and the positive signal input of error amplifier 210. The opposite terminal of resistor R2F is connected to circuit ground.

In operation, switch 216 is moved from a standby or "off" position to an "on" position. FIG. 4 illustrates the decay of unregulated battery cell output voltages over time. These unregulated voltages could represent an output of voltage regulator circuit 200 with switch 216 in a standby position. Conversely, with switch 216 in an "on" position, thermal voltage reference 212 provides a thermally stable output reference voltage to the bias input of error amplifier 210, and a second, stable output reference voltage to the negative signal input of amplifier 210. Thus, a temperature independent reference level is set for amplifier 210. A thermally stable reference voltage output from reference 212 is also applied to node 206. Consequently, error amplifier 210 provides an output signal to the gate of MOSFET switch Q1, which is turned on to allow current flow from cell 202 to the positive external connection (+) of the battery. Initially, as the voltage at output connection Vout is increased, the voltage at node 208 is decreased to provide a corresponding decreased output voltage from error amplifier 210 to the gate of Q1. As a result, the conduction of current through transistor switch Q1 is decreased, which decreases the output voltage Vout at the external positive connection (+) of the battery. Eventually, the steady state provides a stable output voltage Vout. Over time, as the output voltage Vin of cell 202 decays, the voltage at node 208 is increased, and the output voltage from error amplifier 210 is increased, which in turn increases the conduction of transistor Q1. Consequently, the voltage Vout is maintained at a constant value over the useful life of cell 202. FIG. 5 illustrates regulation of battery cell output voltages over time according to the teachings of the present invention. Each of regulated voltages V1R and V2R may represent, for example, respective regulated voltages of voltage regulator circuit 200 for a nickel metal hydride or nickel cadmium cell. However, a similarly stable output voltage trend over time, such as each of those shown in FIG. 5, may be envisioned for any other appropriate battery cell (e.g., throw-away battery) used according to the teachings of the present invention.

FIG. 6 illustrates an electrical schematic circuit diagram of a preferred embodiment of an overtemperature protection circuit that may be embedded in a battery according to the teachings of the present invention. In an aspect of the invention, similar to the voltage regulator embodiment, MOSFET switch Q1 of overtemperature protection circuit 600 may be connected in series with cell 202 and the two, external connections of the battery. Specifically, the negative external connection (−) of the battery is connected to the negative pole of cell 202. The positive pole of cell 202 is connected to the source of MOSFET switch Q1 and voltage input connection Vin of overtemperature control circuit 604. The drain of switch Q1 is connected to the positive external connection (+) of the battery and node 607 of control circuit 604. The gate of Q1 is connected to node 622 of control circuit 604. The cathode of diode D1, which may be a P-N junction diode, is connected to the negative external connection (−) of the battery, and the anode of D1 is connected to node 628 of control circuit 604. Control circuit 604 is generally shown as grounded to the negative external connection (−) of the battery.

FIG. 7 illustrates an electrical schematic circuit diagram of control circuit 604 shown in FIG. 6. Referring to FIGS. 6 and 7, node 618 (Vin) is connected to one pole of on/off switch 616 and the source of switch Q1. Switch 616 is shown for illustrative purposes only, as a single-pole double-throw switch, but the invention is not intended to be limited to a particular type of switch. The function of on/off switch 616 is to switch to the "off" or standby position when a predetermined signal threshold (voltage or current) is detected at the switching contact, which is connected to node 624. Therefore, for example, switch 616 may be a MOSFET switch or other appropriate type of input signal-sensitive switching device. A MOSFET switch configuration may be selected whereby the transistor is cut off when a predetermined level of voltage (or current) is applied to the drain. On/off switch 616 is operated in the normally closed position, as shown by the solid line representing the operating position of the switching pole of switch 616. The dashed line represents the switching pole in the open or standby position. The switching pole of switch 616 is connected to node 614, and the control pole of the switch is connected to node 624 on the standby control line. For a MOSFET switch, the gate would be connected to node 624. In the position shown by the dashed line in FIG. 7, switch 616 is in the "off" or standby position. In the "on" or operating position of switch 616 shown by the solid line, the switching pole connects node 614 through the switch to voltage input connection Vin. Node 614 is also connected to an output connection of thermal voltage reference 612, which is used to provide temperature stability for the control circuit. Additionally, node 614 is connected to a bias input of error amplifier 610. A second output connection of thermal voltage reference 612 is connected to the negative signal input connection of error amplifier 610. A third output connection of thermal voltage reference 612 is connected to the negative signal input connection of error amplifier 626. Thus, a temperature independent reference level is set for amplifiers 610 and 626. An output of error amplifier 610 is connected to node 622 and the gate of transistor Q1. Reference 612, and amplifiers 610 and 626 are connected to circuit ground, which is wired to the negative external connection (−) of cell 202 and the battery. Node 607 is connected to a terminal of resistor R1F and the drain of transistor Q1. The opposite terminal of resistor R1F is connected to one terminal of resistor R2F, node 608, and the positive signal input of error amplifier 610. The opposite terminal of resistor R2F is connected to circuit ground. The anode of temperature sensitive diode D1 is connected to the positive signal input of error amplifier 626 at node 628. The signal output of error amplifier 626 is connected to node 624.

In operation, control circuit 604 is designed generally to detect the amount of current flowing through diode D1, as a function of temperature. In a normal operating state, in which cell temperature is below a predetermined level, control circuit 604 may operate virtually identically to control circuit 204 of FIG. 3 to provide the above-described voltage regulation function of the invention. However, when the temperature of cell 602 rises, typically when cell 202 is being recharged, current flow through diode D1 is increased and the current signal input at node 628 is increased. Accordingly, the output voltage from error amplifier 626 is increased. When a predetermined level of voltage is sensed at node 624, switch 616 switches to the standby or "off" position (dashed line), which opens the circuit between node 614 and input voltage connection Vin. Therefore, the input voltage at Vin is removed from the bias input of error amplifier 610. The output voltage from error amplifier 610 at node 622 is decreased below a predetermined level, which cuts off transistor Q1. Consequently, when the temperature sensed by diode D1 reaches a predetermined level (e.g., based on a threshold selected by the setting of switch 616), transistor Q1 may be cut off to present an effective open circuit to the recharge current flow path. Therefore, both the battery and portable system may be protected from potential damage due to overtemperature.

In another aspect of the invention, for example, control circuit 604 may comprise a sub-miniaturized bimetallic switch. In such an arrangement, the bimetallic switch would be operated in its normally closed position. As long as current flow from diode D1 were to remain below a predetermined value, the switch would remain closed, and voltage from the positive pole of cell 202 would be applied to the base of transistor Q1 to maintain conduction. However, if the current through diode D1 (and through the bimetallic elements of the switch) were to exceed a predetermined value, the bimetallic switch would open and the voltage from cell 202 would be removed from the base of transistor Q1. Consequently, transistor Q1 would be turned off and the recharge path for the cell would be opened.

It should be understood that the teachings of the present invention may also apply to rechargeable and throw-away batteries for use in applications other than portable communications systems, such as, for example, back-up power sources for digital clocks or thermostats, etc. In other words, the present invention may be used in conjunction with any appropriate embedded battery application.

Although the present invention and its advantages have been described in detail, it should be understood that various changes, substitutions and alterations can be made herein without departing from the spirit and scope of the invention as defined by the appended claims.

What is claimed is:

1. An embedded battery voltage regulator comprising:

a battery having a power terminal and a ground terminal;

a switch formed in the casing of said battery having a first current handling terminal connected to said power terminal of said battery, a second current handling terminal and a control terminal;

a thermally stable voltage reference circuit formed in the casing of said battery having a first reference voltage output terminal, a second reference output terminal, a ground terminal connected to the ground terminal of said battery and a power input terminal connected to said second current handling terminal of said switch;

a transistor formed in the casing of said battery having a first current handling terminal connected to said power terminal of said battery, a second power handling terminal connected to a regulated output terminal an a control terminal;

an output voltage measurement circuit formed in the casing of said battery connected between said regulated output terminal and said ground terminal of said battery, and having an output terminal which provides a signal proportional to a voltage level on said regulated output terminal;

a first comparator formed in the casing of said battery having a first input terminal connected to said first reference voltage output terminal and a second input terminal connected to said output terminal of said output voltage measurement circuit, and having an output terminal connected to said control terminal of said transistor;

a second comparator formed in the casing of said battery having a first input terminal connected to said second reference voltage output terminal, a second input terminal and an output terminal connected to said control terminal of said switch; and a thermally sensitive diode formed in the casing of said battery having an anode connected to said ground terminal of said battery and a cathode connected to said second input terminal of said comparator, said second comparator providing a signal to said switch to become open when said diode indicates an overtemperature condition.

2. An embedded battery voltage regulator as in claim 1 wherein said transistor is a field effect transistor.

3. An embedded battery voltage regulator as in claim 1 wherein said transistor, said thermally stable voltage source, said output voltage measurement circuit, said first comparator, said switch, said diode and said second comparator are formed on a single semiconductor substrate.

4. An embedded battery voltage regulator as in claim 1 wherein said switch is a field effect transistor.

5. An embedded battery voltage regulator as in claim 1 wherein said output voltage measurement circuit comprises a voltage divider.

* * * * *